(12) United States Patent
Tomioka

(10) Patent No.: US 8,064,143 B2
(45) Date of Patent: Nov. 22, 2011

(54) VARIABLE POWER OPTICAL SYSTEM AND IMAGING DEVICE

(75) Inventor: Ukyo Tomioka, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 230 days.

(21) Appl. No.: 12/395,280

(22) Filed: Feb. 27, 2009

(65) Prior Publication Data
US 2009/0219627 A1 Sep. 3, 2009

(30) Foreign Application Priority Data

Feb. 29, 2008 (JP) ................. P2008-049313

(51) Int. Cl.
*G02B 15/14* (2006.01)
(52) U.S. Cl. .................. 359/680; 359/689; 359/691
(58) Field of Classification Search .................. 359/689, 359/691, 680–682
See application file for complete search history.

(56) References Cited

U.S. PATENT DOCUMENTS
2001/0000132 A1* 4/2001 Nagaoka ....................... 359/654

FOREIGN PATENT DOCUMENTS
| JP | 8-5914 A | 1/1996 |
| JP | 2005-134887 A | 5/2005 |
| JP | 2006-119574 A | 5/2006 |
| JP | 2007-232996 A | 9/2007 |

OTHER PUBLICATIONS

European Office Action corresponding to Application No. 09 002 748.3-1234 dated Apr. 14, 2011.
European Office Action corresponding to Application No. 09 002 748.3-1234 dated Jul. 8, 2010.
European Office Action corresponding to Application No. 09002748. 3-2217 dated Apr. 14, 2009.
European Office Action corresponding to Application No. 09002748. 3-2217 dated Jun. 3, 2009.

* cited by examiner

Primary Examiner — James Greece
(74) Attorney, Agent, or Firm — Birch, Stewart, Kolasch & Birch, LLP

(57) ABSTRACT

A variable power optical system is provided and includes: in order from the object side, a first lens group having a negative refractive power and including a negative lens group and a positive lens group; a stop; and a second lens group having a positive refractive power and including a sub-lens group on the most object side, the sub-lens group including a first lens having a positive refractive power having at least one aspherical surface, a second lens having a positive refractive power, and a third lens having a positive refractive power. The second lens group is moved to the object side along an optical axis thereof to perform a variable power operation from a wide angle end to a telephoto end of the variable power optical system, and the first lens group is moved to make a correction of an image plane position in accordance with the variable power operation.

14 Claims, 10 Drawing Sheets

WIDE

Fno.=1.23
— d-LINE
— — g-LINE
----- C-LINE
-0.05mm  0.05mm
SPHERICAL ABERRATION

ω=64.2°
— SAGITTAL
----- TANGENTIAL
-0.05mm  0.05mm
ASTIGMATISM

ω=64.2°
-50%  50%
DISTORTION

TELE

Fno.=1.95
— d-LINE
— — g-LINE
----- C-LINE
-0.05mm  0.05mm
SPHERICAL ABERRATION

ω=21.9°
— SAGITTAL
----- TANGENTIAL
-0.05mm  0.05mm
ASTIGMATISM

ω=21.9°
-50%  50%
DISTORTION

WIDE

TELE

WIDE

Fno.=1.22
d-LINE
g-LINE
C-LINE
-0.05mm  0.05mm
SPHERICAL ABERRATION

ω=64.1°
SAGITTAL
TANGENTIAL
-0.05mm  0.05mm
ASTIGMATISM

ω=64.1°
-50%  50%
DISTORTION

TELE

Fno.=2.01
d-LINE
g-LINE
C-LINE
-0.05mm  0.05mm
SPHERICAL ABERRATION

ω=21.9°
SAGITTAL
TANGENTIAL
-0.05mm  0.05mm
ASTIGMATISM

ω=21.9°
-50%  50%
DISTORTION

WIDE

SPHERICAL ABERRATION

ASTIGMATISM

DISTORTION

TELE

SPHERICAL ABERRATION

ASTIGMATISM

DISTORTION

VARIABLE POWER OPTICAL SYSTEM AND IMAGING DEVICE

This application is based on and claims priority under 35 U.S.C §119 from Japanese Patent Application No. 2008-049313, filed on Feb. 29, 2008, the entire disclosure of which is herein incorporated by reference.

BACKGROUND OF THE INVENTION

1. Field of the Invention

The present invention relates to a variable power optical system and an imaging device used for a video camera, an electronic still camera and so forth. More particularly, the present invention relates to a variable power optical system and an imaging device equipped with the variable power optical system capable of being preferably used as a surveillance camera.

2. Description of Related Art

There is an increasing demand for surveillance cameras used when empty facilities are operated. Recently, surveillance cameras, the magnifying power of which can be varied, are demanded. A variable power optical system used for the above surveillance cameras needs to be a bright optical system, the aperture ratio of which is high so that a photographic object can be specified even under the photographing condition of low illuminance. Further, the optical system applied to the surveillance cameras needs to be compact and provided with excellent optical performance.

An example of the variable power optical system is disclosed in JP-A-2006-119574, in which the aperture ratio is high, but the size is small and the optical performance is excellent, and which is capable of being mounted on a surveillance camera. The optical system described in JP-A-2006-119574 includes: a first group which is negative; a stop; and a second group which is positive, in order from the object side. The second group includes four lenses including two biconvex lenses, a negative meniscus lens and a biconvex lens in order from the object side.

In this connection, recently, there is a rising demand for an image of high quality even in the use of surveillance cameras. Especially, a demand for a variable power optical system is increasing which is applicable to cameras having imaging elements, the number of pixels of which is not less than one million. However, in order to satisfy the above demand by the conventional optical system, it is necessary to reduce an aperture ratio. In this case, it is difficult to use this optical system under an imaging condition of the use of surveillance cameras in which illuminance is low.

SUMMARY OF THE INVENTION

An object of an illustrative, non-limiting embodiment of the present invention is to provide a variable power optical system, the optical performance of which is high so that an image of high quality can be attained although the size is small and the aperture ratio is high. Another object of the present invention is to provide an imaging device having the variable power optical system.

According to an aspect of the invention, there is provided a variable power optical system of the present invention including: in order from an object side thereof, a first lens group having a negative refractive power; a stop; and a second lens group having a positive refractive power. The second lens group is moved to the object side along an optical axis thereof to perform a variable power operation from a wide angle end to a telephoto end of the variable power optical system, and the first lens group is moved to make a correction of an image plane position in accordance with the variable power operation. The first lens group includes a negative lens group and a positive lens group in order from the object side, the second lens group includes a sub-lens group on the most object side, and the sub-lens group includes a first lens having a positive refractive power having at least one aspherical surface, a second lens having a positive refractive power, and a third lens having a positive refractive power in order from the object side.

In this connection, "the lens group" described above includes not only a lens group having a plurality of lenses but also a single lens.

In the variable power optical system, in the sub-lens group of the second lens group, the second and the third lens, which are two positive lenses, are arranged on the image side of the first lens of an aspherical lens. When necessary positive power is dispersed to the two lenses, it is possible to reduce sensitivity with respect to errors generated when the first lens is manufactured. At the same time, it is possible to suppress longitudinal chromatic aberration generated in the second and the third lens. Accordingly, it is possible to easily attain a high optical performance capable of obtaining an image of high quality.

In the variable power optical system, it is preferable that the following conditional expression (1) is satisfied:

$$1.2 < f2/f2 < 4.5 \quad (1)$$

where f2 is a focal length of the second lens group and f21 is a focal length of the first lens.

In the variable power optical system, it is preferable that the following conditional expression (2) is satisfied:

$$vd2m > 60.0 \quad (2)$$

where vd2m is an average value of Abbe numbers of the second and the third lens at the d-line.

In the variable power optical system, it is preferable that the second lens group includes five lenses including the sub-lens group, a negative meniscus lens having a concave surface on the image side, and a biconvex lens having a positive refractive power in order from the object side.

In the variable power optical system, the first lens group may include three lenses including a negative meniscus lens, a biconcave lens having a negative refractive power, and a positive lens in order from the object side. Alternatively, the first lens group may include four lenses including a negative meniscus lens, a negative meniscus lens, a biconvex lens having a negative refractive power, and a positive lens in order from the object side.

In the variable power optical system, it is preferable that the first lens group includes at least one positive lens satisfying the following conditional expression (3):

$$vd1p < 21.0 \quad (3)$$

where vd1p is an Abbe number of the at least one positive lens at the d-line.

In this case, it is preferable that the positive lens on the most image side among the positive lenses contained in the first lens group satisfies the conditional expressing (3). In this case, longitudinal chromatic aberration can be advantageously corrected.

The variable power optical system may further include a third lens group having a negative refractive power which is fixed at the time of the variable power operation and arranged on the image side of the second lens group.

According to an aspect of the invention, there is provided an imaging device including: a variable power optical system described above; and an imaging element for taking an object image formed by the variable power optical system. Examples of the imaging device are: a television camera, a video camera, a surveillance camera and so forth.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Figure 1:
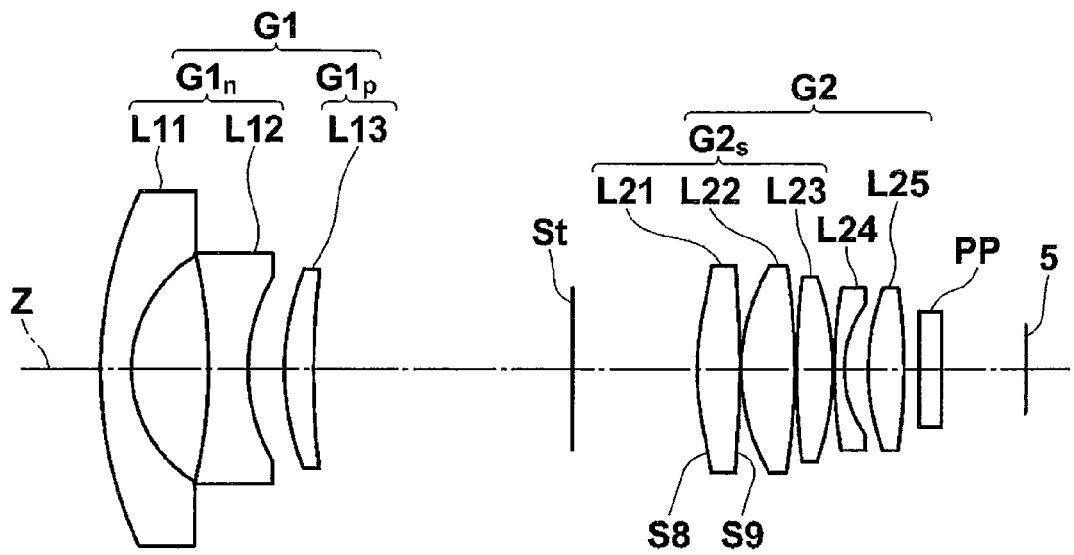
FIG. 1 is a sectional view showing a lens arrangement of a variable power optical system of Example 1 of the present invention.

A variable power optical system according to an exemplary embodiment of the present invention includes: a first lens group including a negative power lens group and a positive power lens group having a negative refractive power as a whole; and a second lens group having a positive refractive power, wherein these lens groups are arranged in order from an object side. In a sub-lens group on the most object side of the second lens group, an aspherical lens is effectively arranged and two positive lenses are arranged on an image side of the aspherical lens so that positive power is dispersed. Due to the above constitution, even the variable optical system is small in size and the aperture ratio is high, it is possible to realize a high optical performance capable of attaining an image of high quality.

An imaging device of the present invention has a variable power optical system of the present invention. Therefore, size of the imaging device can be reduced small and even in a photographing condition of low illuminance, the imaging device can be excellently used and an image of high quality can be obtained.

Referring to the drawings, exemplary embodiments of the present invention will be explained in detail below.

FIG. 1 is a sectional view showing an arrangement of a variable power optical system according to an exemplary embodiment of the present invention. FIG. 1 corresponds to a variable power optical system of Example 1 described later. FIGS. 2 to 6 are sectional views showing arrangements of variable power optical systems of other exemplary embodiments of the present invention. FIGS. 2 to 6 respectively correspond to variable power optical systems of Examples 2 to 6 described later.

Examples 1 to 6 shown in FIGS. 1 to 6 are basically composed in the same manner. FIGS. 1 to 6 are illustrated basically in the same manner. Therefore, referring to FIG. 1, a variable power optical system of an exemplary embodiment of the present invention will be explained here.

This variable power optical system includes: a first lens group G1 having a negative refractive power; an aperture stop St; and a second lens group G2 having a positive refractive power, in order from an object side along the optical axis Z. The above constitution in which the first lens group has the negative refractive power is suitable for realizing a wide angle and further a back focal length can be relatively easily ensured.

In this connection, the aperture stop St shown in FIG. 1 does not necessarily express a size and a shape of the aperture stop St but expresses a position on the optical axis Z. In FIG. 1, the left side is an object side and the right side is an image side. FIG. 1 shows a lens arrangement at the wide angle end at the time of focusing an infinite point. A locus of the movement of each lens group at the time of varying the magnifying power from the wide angle end to the telephoto end is schematically shown in a lower portion of FIG. 1.

In FIG. 1, consideration is given to a case in which the variable power optical system is applied to an imaging device. Therefore, the imaging element 5 arranged on the image formation plane of the variable power optical system is also shown in FIG. 1. The imaging element 5 captures an image of an object which is formed by the variable power optical system. An imaging plane of the imaging element 5 is located on an image formation plane of the variable power optical system.

When the variable power optical system is applied to the imaging device, it is preferable that one of the various type filters such as a cover glass, an infrared ray cutting filter and a low pass filter is arranged between the optical system and the image formation plane (the imaging plane) according to the constitution on the camera side onto which the lens is attached. In the example, shown in FIG. 1, the optical member PP, which is formed into a parallel-plate-shape, is arranged between the second lens group G2 and the imaging element 5.

This variable power optical system is configured as follows. When the second lens group G2 is moved to an object side on the optical axis Z, the magnifying power is varied from the wide angle side to the telephoto side. A correction of the imaging plane position, which is accompanied by the variable power operation from the wide angle end to the telephoto end, is made by moving the first lens group G1 onto the image surface side along the optical axis Z. When the magnifying power is varied from the wide angle end to the telephoto end, the first lens group G1 and the second lens group G2 are moved so that they can draw the loci shown by solid line arrows in FIG. 1. In this variable power optical system, when the first lens group G1 is moved along the optical axis Z, focusing is executed. The first lens group G1 also has a function of a focusing group.

The first lens group G1 includes a negative lens group G1n having a negative refractive power and a positive lens group G1p having a positive refractive power in order from the object side. In the example shown in FIG. 1, the first lens group G1 includes three lenses. The negative lens group G1n includes: a lens L11 which is a negative meniscus lens having a convex surface on the object side; and a lens L12 which is a biconcave lens having a negative refractive power. The positive lens group G1p includes a lens L13 which is a positive meniscus lens having a convex surface on the object side.

As shown in the example illustrated in FIG. 1, when the negative meniscus lens having the convex surface on the object side, is arranged on the most object side in the lens system, the spherical aberration at the telephoto end can be easily corrected and further the angle of view can be advantageously made wide.

In the second lens group G2, the sub-lens group G2s having a positive refractive power as a whole is arranged on the most object side. The sub-lens group G2s includes: a first lens having a positive refractive power having at least one aspherical surface; a second lens having a positive refractive power; and a third lens having a positive refractive power.

In the example shown in FIG. 1, in the paraxial region, the first lens, the second lens and the third lens of the sub-lens group G2s respectively correspond to the biconvex lens L21, the biconvex lens L22 and the biconvex lens L23. In the example shown in FIG. 1, the second lens group G2 includes five lenses including: a lens L24 which is a negative meniscus lens having a concave surface on the image side; and a lens L25 which is a biconvex lens having a positive refractive power, in order from the image side of the lens group G2s.

The constitution of the second lens group G2 of the present embodiment is compared with the optical system described in JP-A-2006-119574 as follows. The second lens group of JP-A-2006-119574 includes four lenses including an aspherical biconvex lens, a biconvex lens, a negative meniscus lens and a biconvex lens. That is, in the constitution of JP-A-2006-119574, one biconvex lens is arranged between the aspherical lens of the second lens group and the negative meniscus lens. However, in the constitution of the present embodiment, two biconvex lenses are arranged, which is a greatly different point. When a necessary positive refractive power is given to two lenses being dispersed like the present embodiment, it is possible to reduce sensitivity with respect to errors which were generated in the manufacturing process of the lens (L21 in FIG. 1) arranged on the most object side of the second lens group G2. Further, it is possible to suppress the longitudinal chromatic aberration generated in the second and the third lens by the ray passing through a region, the pupil of which is large. Accordingly, it is possible to obtain a high optical performance by which an image of high quality can be obtained.

In the second lens group G2, when the lens L21 arranged on the most object side is made to be an aspherical lens, the spherical aberration, which is generated being accompanied by the high aperture ratio, can be easily corrected and it becomes easy to ensure a high aperture ratio. To be in more detail, it is preferable that the lens L21 is a biconvex lens for converging a light flux dispersed by the first lens group G1 having a negative refractive power. On the assumption that the lens L21 is a spherical lens, the positive refractive power is increased in a direction from the optical axis to the periphery and the spherical aberration is excessively corrected in the peripheral portion.

On the other hand, when the lens L21 is made to be an aspherical lens like the present embodiment and a shape of the lens L21 is formed in such a manner that the positive refractive power is reduced in a direction from a portion near the optical axis to the periphery of the lens as shown in the example illustrated in FIG. 1, the spherical aberration can be prevented from being excessively corrected and an amount of generation of the spherical aberration can be reduced. Accordingly, a high aperture ratio can be easily realized.

When the lens L21 is made to be an aspherical lens, various types of aberration including the chromatic aberration can be easily corrected. Therefore, while the size is being reduced, a high optical performance can be easily ensured. Especially, as shown by the example illustrated in FIG. 1, when the biconvex lens, both the surface S8 on the object side and the surface S9 on the image side of which are aspherical, is used, it is possible to obtain a higher aberration correcting effect. When the entire sub-lens group G2s is constituted by biconvex lenses, it becomes easy to ensure positive refractive power necessary for converging a light flux dispersed by the first lens group G1. Accordingly, by the decreased number of lenses and the reduced size of the device, the aberration can be effectively corrected.

In the present variable power optical system, when the above constitution is employed, while the high aperture ratio is being maintained, it is possible to realize a high optical performance, by which an image of high quality can be obtained, by a compact structure. For example, the variable power optical system shown in FIG. 1 is configured by eight lenses including the first lens group G1 of three lenses and the second lens group G2 of five lenses, that is, the variable power optical system shown in FIG. 1 is a compact variable power optical system.

However, the variable power optical system of the present invention is not limited to the number and shape of lenses shown in FIG. 1 but the variable power optical system can be formed into various embodiments like the examples described later. For example, in the variable power optical system of the present invention, the third lens group having a negative refractive power, which is fixed at the time of variable power operation, may be further arranged on the image side of the second lens group G2. When this third lens group is added, the image size can be changed. Therefore, it becomes possible to cope with a change in size of the imaging element. Specifically, it is possible to cope with a change in the imaging element in the case where CCD is changed from 6 mm to 8 mm.

When the variable power optical system of the present invention employs the following preferable embodiments in addition to the constitution described above, it becomes possible to obtain a more excellent optical performance. Preferable embodiments are enumerated as follows.

In the variable power optical system, it is preferable that the following conditional expression (1) is satisfied:

$$1.2 < f21/f2 < 4.5 \qquad (1)$$

where f2 is a focal length of the second lens group G2 and f21 is a focal length of the first lens.

The conditional expression (1) relates to a ratio of the focal length of the second lens group G2 to the focal length of the first lens. In other words, the conditional expression (1) expresses a preferable range of the contribution of the first lens with respect to the positive refractive power of the second lens group G2. When the focal length exceeds the upper limit of the conditional expression (1), a contribution of the first lens with respect to the positive refractive power of the second lens group G2 is decreased and a load given to the other lens arranged on the image side of the first lens is increased. Accordingly, this is disadvantageous in the correction of the longitudinal chromatic aberration. When the focal length falls below the lower limit of the conditional expression (1), a contribution of the first lens with respect to the positive refractive power of the second lens group G2 is increased. Accordingly, a deterioration of the performance, which is generated by errors caused in manufacturing the first lens, is increased.

In the variable power optical system, it is preferable that the following conditional expression (2) is satisfied:

$$vd2m > 60.0 \quad (2)$$

where vd2m is an average value of Abbe numbers of the second and the third lens of the sub-lens group G2s at the d-line.

When it exceeds the lower limit of the conditional expression (2), the longitudinal chromatic aberration generated in the second and the third lens of the sub-lens group G2s is increased.

It is preferable that the second and the third lens, which are positive refractive power lenses, are made of low dispersion material. In order to obtain a more excellent optical performance, it is preferable that the present variable power optical system satisfies the following conditional expression (2-1):

$$vd2m > 80.0 \quad (2-1)$$

When consideration is given to the characteristic of material capable of being presently used for the optical parts, it is preferable that the following conditional expression (2-2) is satisfied:

$$vd2m < 97.0 \quad (2-2)$$

where vd2m is an average value of Abbe numbers of the second and the third lens of the sub-lens group G2s at the d-line.

In the variable power optical system of the present invention, it is preferable that the first lens group G1 includes at least one positive lens, and the following conditional expression (3) is satisfied:

$$vd1p < 21.0 \quad (3)$$

where vd1p is an Abbe number of the at least one positive lens at the d-line.

When it exceeds the upper limit of the conditional expression (3), the longitudinal chromatic aberration is increased on the telephoto end side.

In this connection, for example, in the case where the variable power optical system of the present invention is used in a severe environment such as in the open air, it is preferable that the lens arranged on the most object side is resistant to the surface deterioration caused by wind and rain and also resistant to the change in temperature caused by direct rays of the sun. Further, it is preferable that the lens arranged on the most object side is resistant to chemicals such as oil and detergent, that is, it is preferable that the lens arranged on the most object side is made of material having water resistance, weather resistance, oxidation resistance and chemical resistance. Further, it is preferable that the lens arranged on the most object side is made of hard material to be seldom cracked. Due to the foregoing, specifically, it is preferable to use glass. Alternatively, it is possible to use transparent ceramics.

Concerning the material of the lens on which an aspherical shape is formed, it is preferable to use plastics. In this case, the aspherical shape can be accurately formed. Further, it is possible to reduce the weight and the manufacturing cost.

When it is required that the variable power optical system can be used in a wide temperature range, it is preferable that each lens is made of material, the coefficient of linear expansion of which is low. In the case where the variable power optical system is used in a severe environment, it is preferable that the system is coated with a multiple layer film coat for protection. Except for the coat for protection, a reflection prevention coat film may be used for reducing ghost rays at the time of use.

In the example shown in FIG. 1, the optical member PP is arranged between the lens system and the image formation plane. However, instead of arranging various filters such as a low pass filter or filters to cut a specific wavelength region, these various filters may be arranged between the lenses. Alternatively, a coat having the same function as that of each filter may be applied to a surface of one of the lenses.

As explained above, according to a variable power optical system of the present embodiment, when the above preferable constitution is appropriately employed according to a demanded specification, while the aberration is being excellently corrected, it is possible to reduce the size and increase the aperture ratio. Therefore, an image of high quality can be easily obtained which responds to a camera having imaging elements of not less than one million pixels.

EXAMPLES

Next, specific numerical examples of the variable power optical system of the present embodiment will be explained below.

Example 1

FIG. 1 is a sectional view of the lenses of Example 1. The lens constitution has already been described before. The surface S8 on the object side of the lens L21 on the most object side of the second lens group G2 and the surface S9 on the image side are aspherical. In the aperture stop St, a diameter of the stop is variable and a position is fixed.

Lens data of the variable power optical system of Example 1 is shown on Table 1, aspherical data is shown on Table 2 and various data is shown on Table 3. In this connection, the meanings of reference marks on Tables 1 to 3 described below are the same as those of the examples described later.

In the lens data shown on Table 1, Si is a surface number, the order of which is i (i=1, 2, 3, ... ), wherein the number of the surface of the component on the most object side is the first and this number is increased when it comes to the image side. Ri is a radius of curvature of the surface, the number of which is i. Di is an on-axis sursurface spacing between the surface, the number of which is i, and the surface, the number of which is i+1, on the optical axis Z. Ndj is a refraction factor at the d-line (the wavelength 587.6 nm) of the optical element, the number of which is j (j=1, 2, 3, ... ), wherein the number of the lens on the most object side is the first and this number is increased in order when it comes to the image side. In the data on Table 1, vdj is Abbe Number for the d-line of the optical element, the number of which is j. In this connection, the lens data includes the aperture stop St and the optical member PP. The radius of curvature in the lens data is positive in the case where a surface is convex on the object side and negative in the case where a surface is convex on the image side.

In the lens data shown on Table 1, a surface number of the aspherical surface is attached with the mark *. As a radius of curvature of the aspherical surface, a numerical value of the paraxial radius of curvature is shown. The aspherical data on Table 2 shows an aspherical coefficient with respect to the aspherical surface. The aspherical coefficient is a value of each coefficient K, Bm (m=3, 4, 5, ... ) in the aspherical expression expressed by the following expression (A).

$$Zd = C \cdot h^2 / \{1 + (1 - k \cdot C^2 \cdot h^2)^{1/2}\} + \Sigma Bm \cdot h^m \quad (A)$$

where

Zd: Depth of aspherical surface (Length of vertical line from the point on the aspherical surface of the height h to the plane perpendicular to the optical axis with which apex of the aspherical surface comes into contact)

h: Height (Distance from the optical axis to the lens surface)

C: Reciprocal of paraxial radius of curvature

K, Bm: Aspherical coefficient (m=3, 4, 5, . . . 20)

In the lens data shown on Table 1, variable D1, variable D2 and variable D3 are respectively written in the columns corresponding to the on-axis surface spacing between the first lens group G1 and the aperture stop St, the on-axis surface spacing between the aperture stop St and the second lens group G2 and the on-axis surface spacing between the second lens group G2 and the optical member PP. The above on-axis surface spacing is changed when the variable power operation is executed.

Table 3 shows various data including a focal length of the entire system, F numbers (Fno.), whole angle of view, variable D1, variable D2 and variable D3 at the wide angle end and the telephoto end. The unit of length in the lens data and various data is mm in this case.

TABLE 1

Example 1
Lens Data

| Si | Ri | Di | Ndj | vdj |
|---|---|---|---|---|
| 1 | 28.7395 | 2.08 | 1.80400 | 46.6 |
| 2 | 9.0232 | 5.18 | | |
| 3 | −34.0167 | 2.62 | 1.80400 | 46.6 |
| 4 | 12.4347 | 2.48 | | |
| 5 | 18.7192 | 1.94 | 1.92286 | 18.9 |
| 6 | 58.4868 | Variable D1 | | |
| 7 (Aperture Stop) | — | Variable D2 | | |
| 8* | 17.3426 | 2.87 | 1.56384 | 60.7 |
| 9* | −52.8867 | 0.10 | | |
| 10 | 13.9607 | 3.58 | 1.49700 | 81.6 |
| 11 | −48.5484 | 0.13 | | |
| 12 | 49.0053 | 2.47 | 1.49700 | 81.6 |
| 13 | −18.8730 | 0.10 | | |
| 14 | 32.7786 | 0.65 | 1.84666 | 23.8 |
| 15 | 7.5368 | 1.63 | | |
| 16 | 16.3902 | 2.33 | 1.72916 | 54.7 |
| 17 | −40.5622 | Variable D3 | | |
| 18 | ∞ | 1.50 | 1.51633 | 64.1 |
| 19 | ∞ | | | |

TABLE 2

Example 1
Aspherical Data

S8 (Eighth Surface)

| K | B3 | B4 | B5 | B6 |
|---|---|---|---|---|
| 0.00000E+00 | 1.97686E−04 | −1.99021E−04 | 1.43456E−05 | −1.50554E−06 |

| B7 | B8 | B9 | B10 | B11 |
|---|---|---|---|---|
| −1.32829E−07 | −9.60327E−09 | 1.52205E−09 | −1.63592E−10 | −1.49509E−13 |

| B12 | B13 | B14 | B15 | B16 |
|---|---|---|---|---|
| 7.40458E−13 | 1.63056E−13 | 2.55865E−14 | 1.95062E−15 | 2.67251E−16 |

| B17 | B18 | B19 | B20 |
|---|---|---|---|
| 2.15408E−17 | 1.35338E−18 | 1.83728E−19 | −5.70793E−20 |

S9 (Ninth Surface)

| K | B3 | B4 | B5 | B6 |
|---|---|---|---|---|
| 0.00000E+00 | 1.94639E−04 | 2.03154E−05 | 1.00318E−05 | 1.12926E−06 |

| B7 | B8 | B9 | B10 | B11 |
|---|---|---|---|---|
| −6.71630E−07 | 6.09983E−08 | −1.94895E−09 | 5.58242E−11 | 5.97559E−12 |

| B12 | B13 | B14 | B15 | B16 |
|---|---|---|---|---|
| 5.94100E−13 | 6.09518E−14 | 1.35350E−14 | −5.72959E−16 | 1.84431E−16 |

| B17 | B18 | B19 | B20 |
|---|---|---|---|
| 1.43301E−17 | 3.66484E−18 | 4.38739E−19 | 5.06223E−20 |

TABLE 3

Example 1
Various data

| | Focal Length | Fno. | Whole angle of view | Variable D1 | Variable D2 | Variable D3 |
|---|---|---|---|---|---|---|
| Wide Angle End | 2.85 | 1.23 | 128.4 | 17.32 | 8.42 | 1.00 |
| Telephoto End | 7.85 | 1.95 | 43.8 | 2.39 | 1.61 | 7.82 |

Example 2

Figure 2:
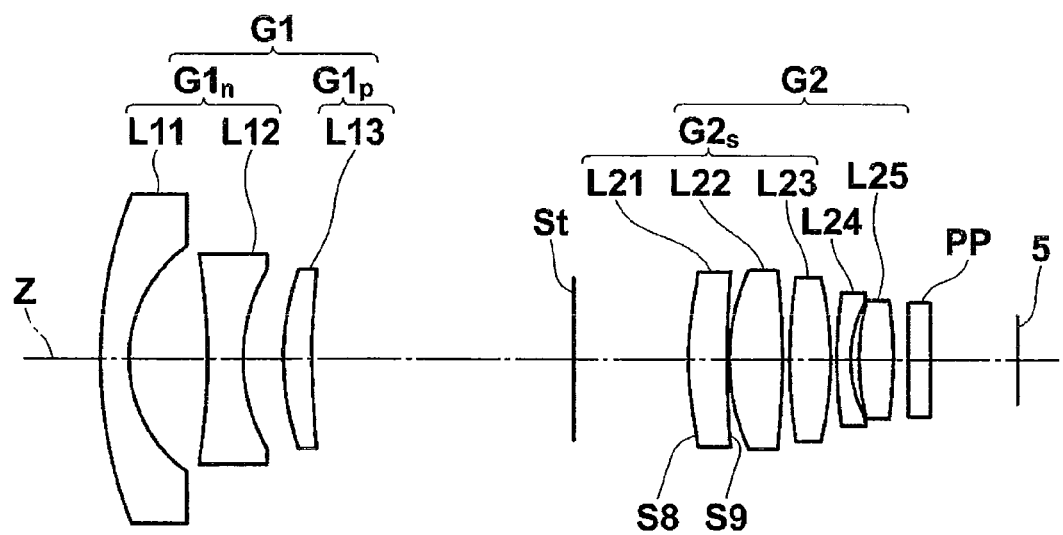
FIG. 2 is a sectional view showing a lens arrangement of a variable power optical system of Example 2 of the present invention.

FIG. 2 is a sectional view of the lenses of Example 2. The variable power optical system of Example 2 includes: a first lens group G1; an aperture stop St; and a second lens group G2. The first lens group G1 includes three lenses including: a negative meniscus lens L11; a biconcave lens L12; and a positive meniscus lens L13. The second lens group G2 includes five lenses including: a positive meniscus lens L21, the convex surface of which is directed onto the object side in the paraxial region; a biconvex lens L22; a biconvex lens L23; a negative meniscus lens L24; and a biconvex lens L25. The surface S8 on the object side of the lens L21 and the surface S9 on the image side are aspherical.

The lens data of the variable power optical system of Example 2 is shown on Table 4. The aspherical data is shown on Table 5. Various data is shown on Table 6.

TABLE 4

Example 2
Lens Data

| Si | Ri | Di | Ndj | vdj |
|---|---|---|---|---|
| 1 | 30.5731 | 1.93 | 1.80400 | 46.6 |
| 2 | 9.4367 | 5.27 | | |
| 3 | −42.5664 | 2.42 | 1.80400 | 46.6 |
| 4 | 12.1145 | 2.71 | | |
| 5 | 18.6349 | 1.93 | 1.92286 | 18.9 |
| 6 | 52.1673 | Variable D1 | | |
| 7 (Aperture Stop) | — | Variable D2 | | |
| 8* | 20.3828 | 2.63 | 1.49700 | 81.6 |
| 9* | 208.7117 | 0.10 | | |
| 10 | 14.5212 | 3.63 | 1.63854 | 55.4 |
| 11 | −57.9106 | 0.48 | | |
| 12 | 36.4379 | 2.79 | 1.49700 | 81.6 |
| 13 | −23.7464 | 0.41 | | |
| 14 | 32.0290 | 0.91 | 1.92286 | 20.88 |
| 15 | 8.2510 | 0.58 | | |
| 16 | 16.7440 | 2.27 | 1.80400 | 46.6 |
| 17 | −30.7914 | Variable D3 | | |
| 18 | ∞ | 1.50 | 1.51633 | 64.1 |
| 19 | ∞ | | | |

TABLE 5

Example 2
Aspherical Data

S8 (Eighth Surface)

| K | B3 | B4 | B5 | B6 |
|---|---|---|---|---|
| 0.00000E+00 | 2.02690E−04 | −2.01723E−04 | 1.37770E−05 | −1.54982E−06 |

| B7 | B8 | B9 | B10 | B11 |
|---|---|---|---|---|
| −1.32286E−07 | −8.87872E−09 | 1.65333E−09 | −1.41687E−10 | 2.42880E−12 |

| B12 | B13 | B14 | B15 | B16 |
|---|---|---|---|---|
| 1.08437E−12 | 1.98033E−13 | 2.97799E−14 | 2.34284E−15 | 3.11106E−16 |

| B17 | B18 | B19 | B20 |
|---|---|---|---|
| 2.53986E−17 | 1.76086E−18 | 2.17609E−19 | −5.37051E−20 |

S9 (Ninth Surface)

| K | B3 | B4 | B5 | B6 |
|---|---|---|---|---|
| 0.00000E+00 | 2.02411E−04 | 2.46390E−05 | 1.08176E−05 | 1.19205E−06 |

| B7 | B8 | B9 | B10 | B11 |
|---|---|---|---|---|
| −6.68741E−07 | 6.12384E−08 | −1.91308E−09 | 6.29415E−11 | 6.96264E−12 |

| B12 | B13 | B14 | B15 | B16 |
|---|---|---|---|---|
| 7.43941E−13 | 7.77935E−14 | 1.57719E−14 | −3.42297E−16 | 2.13115E−16 |

| B17 | B18 | B19 | B20 |
|---|---|---|---|
| 1.71766E−17 | 4.01031E−18 | 4.72542E−19 | 5.46910E−20 |

TABLE 6

Example 2
Various data

| | Focal Length | Fno. | Whole angle of view | Variable D1 | Variable D2 | Variable D3 |
|---|---|---|---|---|---|---|
| Wide Angle End | 2.85 | 1.23 | 128.1 | 17.57 | 7.80 | 1.00 |
| Telephoto End | 7.85 | 1.98 | 43.7 | 2.08 | 1.34 | 7.46 |

Example 3

Figure 3:
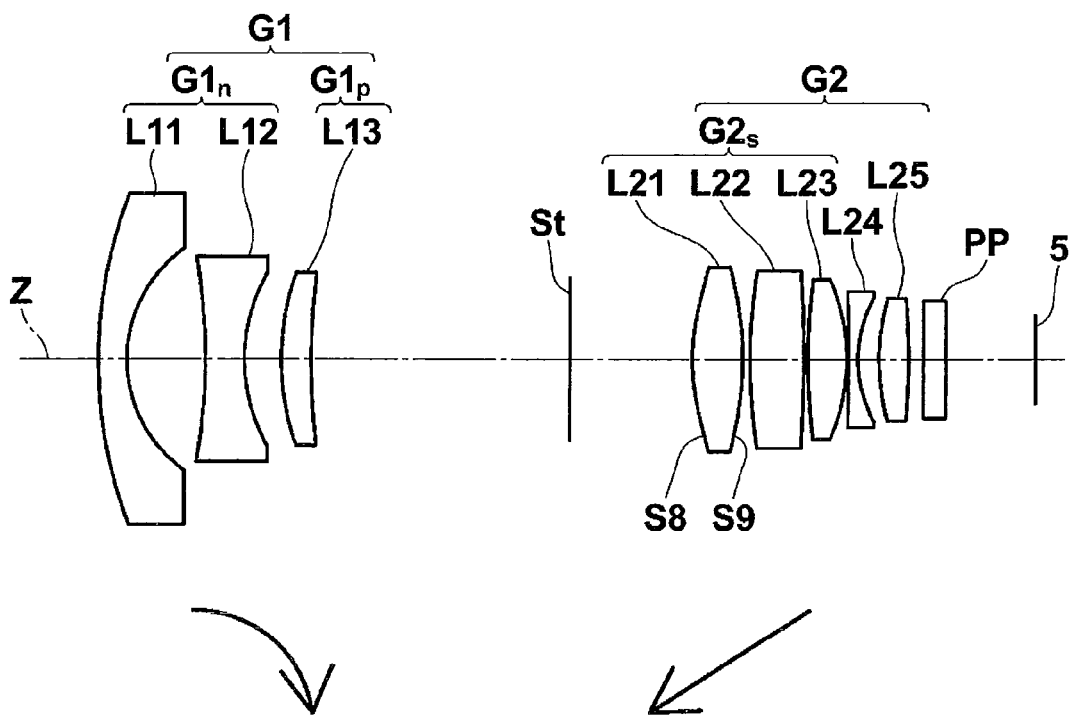
FIG. 3 is a sectional view showing a lens arrangement of a variable power optical system of Example 3 of the present invention.

FIG. 3 is a sectional view showing a lens of Example 3. The variable power optical system of Example 3 includes: a first lens group G1; an aperture stop St and a second lens group G2. The first lens group G1 includes three lenses including a negative meniscus lens L11, a biconcave lens L12 and a positive meniscus lens L13. The second lens group G2 includes five lenses including a biconvex lens L21, a biconvex lens L22, a biconvex lens L23, a biconcave lens L24 and a biconvex lens L25. The surface S8 on the object side of the lens L21 and the surface S9 on the image side are aspherical.

The lens data of the variable power optical system of Example 3 is shown on Table 7, the aspherical data is shown on Table 8 and various data is shown on Table 9.

TABLE 7

Example 3
Lens Data

| Si | Ri | Di | Ndj | vdj |
|---|---|---|---|---|
| 1 | 31.4660 | 1.91 | 1.83481 | 42.7 |
| 2 | 9.3069 | 5.26 | | |
| 3 | −40.7383 | 2.62 | 1.83481 | 42.7 |
| 4 | 11.9033 | 2.47 | | |
| 5 | 17.5214 | 2.00 | 1.92286 | 18.9 |
| 6 | 46.2305 | Variable D1 | | |
| 7 (Aperture Stop) | — | Variable D2 | | |
| 8* | 14.4927 | 3.41 | 1.56384 | 60.7 |
| 9* | −20.5665 | 0.50 | | |
| 10 | 40.0000 | 3.63 | 1.49700 | 81.6 |
| 11 | −100.0000 | 0.26 | | |
| 12 | 43.3165 | 2.63 | 1.49700 | 81.6 |
| 13 | −13.8694 | 0.10 | | |
| 14 | −216.3064 | 0.65 | 1.84666 | 23.8 |
| 15 | 8.7398 | 1.41 | | |
| 16 | 16.4448 | 1.98 | 1.83481 | 42.7 |
| 17 | −39.4845 | Variable D3 | | |
| 18 | ∞ | 1.50 | 1.51633 | 64.1 |
| 19 | ∞ | | | |

TABLE 8

Example 3
Aspherical Data

S8 (Eighth Surface)

| K | B3 | B4 | B5 | B6 |
|---|---|---|---|---|
| 0.00000E+00 | 1.82399E−04 | −2.00592E−04 | 1.48619E−05 | −1.41903E−06 |

| B7 | B8 | B9 | B10 | B11 |
|---|---|---|---|---|
| −1.26650E−07 | −9.39911E−09 | 1.49120E−09 | −1.71946E−10 | −1.26830E−12 |

| B12 | B13 | B14 | B15 | B16 |
|---|---|---|---|---|
| 5.82963E−13 | 1.47513E−13 | 2.38410E−14 | 1.80336E−15 | 2.53196E−16 |

| B17 | B18 | B19 | B20 |
|---|---|---|---|
| 2.05872E−17 | 1.29298E−18 | 1.83346E−19 | −5.64601E−20 |

S9 (Ninth Surface)

| K | B3 | B4 | B5 | B6 |
|---|---|---|---|---|
| 0.00000E+00 | 2.01817E−04 | 2.61380E−05 | 9.83854E−06 | 1.03816E−06 |

| B7 | B8 | B9 | B10 | B11 |
|---|---|---|---|---|
| −6.81774E−07 | 6.00622E−08 | −1.99560E−09 | 5.53529E−11 | 6.30657E−12 |

| B12 | B13 | B14 | B15 | B16 |
|---|---|---|---|---|
| 6.60283E−13 | 6.81189E−14 | 1.43185E−14 | −5.19542E−16 | 1.86863E−16 |

| B17 | B18 | B19 | B20 |
|---|---|---|---|
| 1.40965E−17 | 3.57426E−18 | 4.23556E−19 | 4.80258E−20 |

TABLE 9

Example 3
Various data

| | Focal Length | Fno. | Whole angle of view | Variable D1 | Variable D2 | Variable D3 |
|---|---|---|---|---|---|---|
| Wide Angle End | 2.86 | 1.23 | 128.2 | 17.49 | 8.32 | 1.00 |
| Telephoto End | 7.86 | 2.00 | 43.8 | 3.10 | 1.00 | 8.32 |

Example 4

Figure 4:
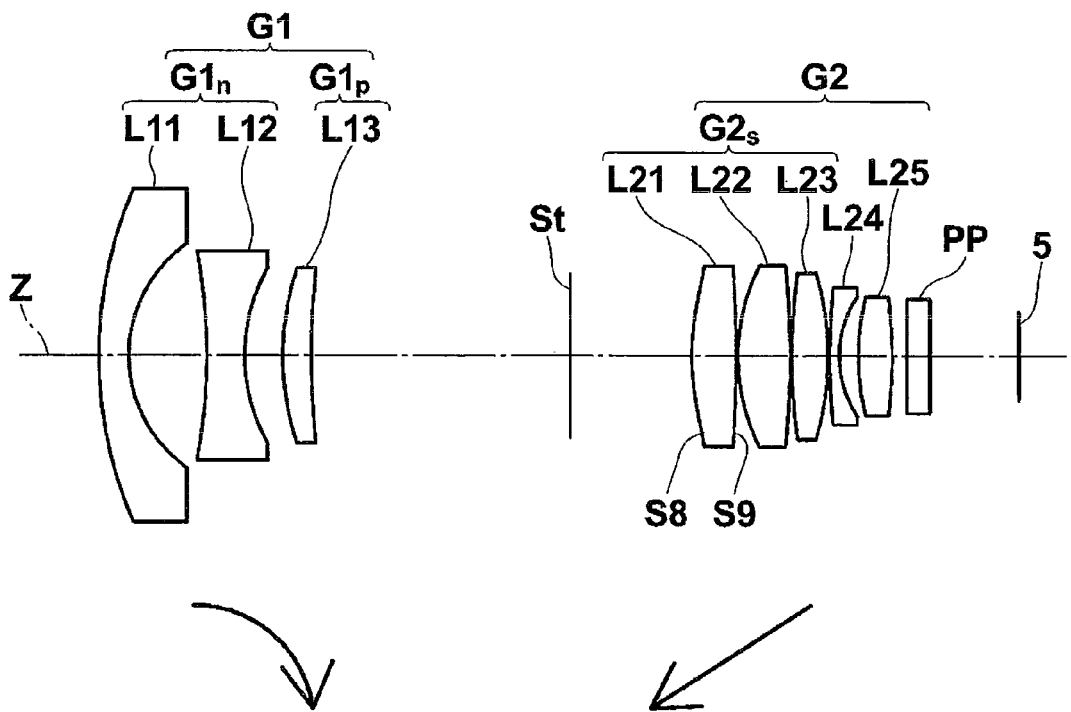
FIG. 4 is a sectional view showing a lens arrangement of a variable power optical system of Example 4 of the present invention.

FIG. 4 is a sectional view showing a lens of Example 4. The variable power optical system of Example 4 includes: a first lens group G1; an aperture stop St and a second lens group G2. The first lens group G1 includes three lenses including a negative meniscus lens L11, a biconcave lens L12 and a positive meniscus lens L13. The second lens group G2 includes five lenses including a biconvex lens L21, a biconvex lens L22, a biconvex lens L23, a negative meniscus lens L24 and a biconvex lens L25. The surface S8 on the object side of the lens L21 and the surface S9 on the image side are aspherical.

The lens data of the variable power optical system of Example 4 is shown on Table 10, the aspherical data is shown on Table 11 and various data is shown on Table 12.

TABLE 10

Example 4
Lens Data

| Si | Ri | Di | Ndj | vdj |
|---|---|---|---|---|
| 1 | 28.6335 | 2.03 | 1.83481 | 42.7 |
| 2 | 9.3593 | 5.21 | | |
| 3 | −38.6584 | 2.54 | 1.83481 | 42.7 |
| 4 | 12.0465 | 2.56 | | |
| 5 | 18.5471 | 1.93 | 1.92286 | 18.9 |
| 6 | 58.7861 | Variable D1 | | |
| 7 (Aperture Stop) | — | Variable D2 | | |
| 8* | 17.2825 | 2.99 | 1.56883 | 56.3 |
| 9* | −64.5795 | 0.10 | | |
| 10 | 13.5966 | 3.55 | 1.51633 | 64.1 |
| 11 | −59.0068 | 0.10 | | |
| 12 | 40.4506 | 2.42 | 1.51633 | 64.1 |
| 13 | −20.5886 | 0.10 | | |
| 14 | 40.1443 | 0.65 | 1.80809 | 22.8 |
| 15 | 7.4731 | 1.29 | | |
| 16 | 17.3053 | 2.25 | 1.6968 | 55.5 |
| 17 | −32.1804 | Variable D3 | | |
| 18 | ∞ | 1.50 | 1.51633 | 64.1 |
| 19 | ∞ | | | |

TABLE 11

Example 4
Aspherical Data

S8 (Eighth Surface)

| K | B3 | B4 | B5 | B6 |
|---|---|---|---|---|
| 0.00000E+00 | 1.99261E−04 | −1.95350E−04 | 1.44549E−05 | −1.51373E−06 |

| B7 | B8 | B9 | B10 | B11 |
|---|---|---|---|---|
| −1.34408E−07 | −9.76204E−09 | 1.51734E−09 | −1.62485E−10 | 1.16277E−13 |

| B12 | B13 | B14 | B15 | B16 |
|---|---|---|---|---|
| 7.87608E−13 | 1.68602E−13 | 2.63006E−14 | 2.01865E−15 | 2.74628E−16 |

| B17 | B18 | B19 | B20 |
|---|---|---|---|
| 2.21339E−17 | 1.40556E−18 | 1.86703E−19 | −5.69919E−20 |

S9 (Ninth Surface)

| K | B3 | B4 | B5 | B6 |
|---|---|---|---|---|
| 0.00000E+00 | 1.94028E−04 | 1.85210E−05 | 9.98672E−06 | 1.11598E−06 |

| B7 | B8 | B9 | B10 | B11 |
|---|---|---|---|---|
| −6.73765E−07 | 6.07362E−08 | −1.96668E−09 | 5.51771E−11 | 6.07456E−12 |

| B12 | B13 | B14 | B15 | B16 |
|---|---|---|---|---|
| 6.25105E−13 | 6.56864E−14 | 1.42892E−14 | −4.83483E−16 | 1.96903E−16 |

| B17 | B18 | B19 | B20 |
|---|---|---|---|
| 1.56938E−17 | 3.84489E−18 | 4.57680E−19 | 5.30489E−20 |

TABLE 12

Example 4
Various data

| | Focal Length | Fno. | Whole angle of view | Variable D1 | Variable D2 | Variable D3 |
|---|---|---|---|---|---|---|
| Wide Angle End | 2.85 | 1.22 | 128.2 | 17.42 | 8.26 | 1.00 |
| Telephoto End | 7.85 | 2.01 | 43.7 | 2.74 | 1.45 | 7.81 |

Example 5

Figure 5:
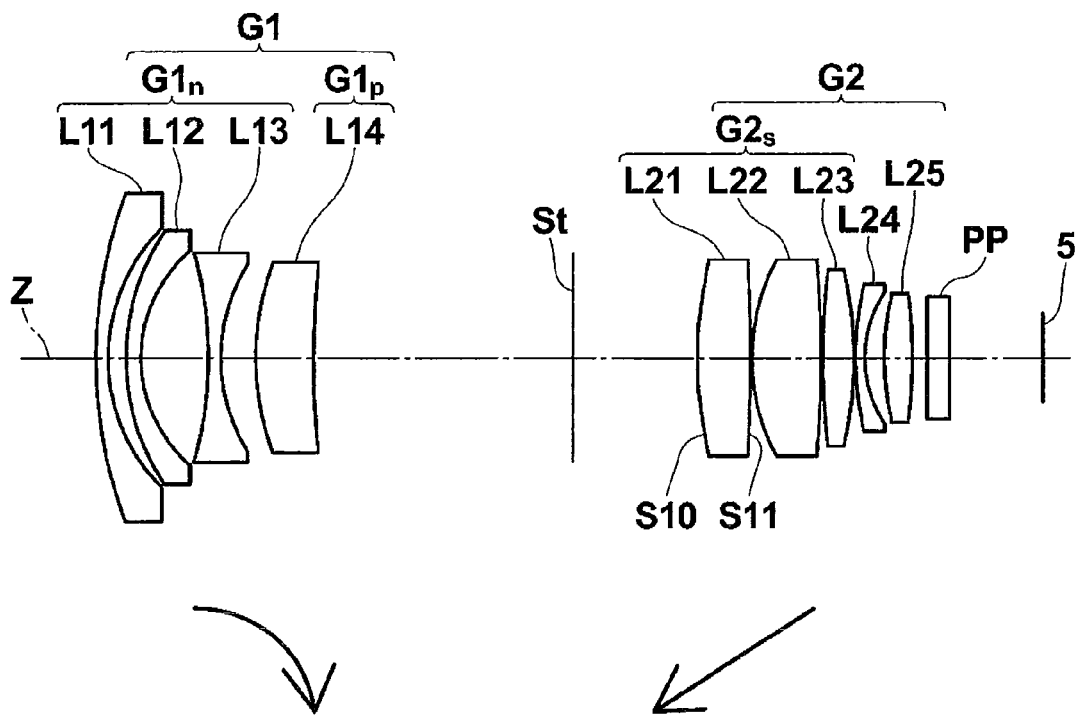
FIG. 5 is a sectional view showing a lens arrangement of a variable power optical system of Example 5 of the present invention.

FIG. 5 is a sectional view showing a lens of Example 5. The variable power optical system of Example 5 includes: a first lens group G1; an aperture stop St and a second lens group G2. The first lens group G1 includes four lenses including a negative meniscus lens L11, a negative meniscus lens L12, a biconcave lens L13 and a positive meniscus lens L14. The second lens group G2 includes five lenses including a biconvex lens L21, a biconvex lens L22, a biconvex lens L23, a negative meniscus lens L24 and a biconvex lens L25. The surface S10 on the object side of the lens L21 and the surface S11 on the image side are aspherical.

The lens data of the variable power optical system of Example 5 is shown on Table 13, the aspherical data is shown on Table 14 and various data is shown on Table 15.

TABLE 13

Example 5
Lens Data

| Si | Ri | Di | Ndj | νdj |
|---|---|---|---|---|
| 1 | 32.3090 | 0.80 | 1.83481 | 42.7 |
| 2 | 12.6155 | 1.20 | | |
| 3 | 15.6846 | 1.00 | 1.83481 | 42.7 |
| 4 | 9.7226 | 4.42 | | |
| 5 | −27.7569 | 0.80 | 1.62041 | 60.3 |
| 6 | 12.0790 | 2.36 | | |
| 7 | 18.6483 | 3.88 | 1.92286 | 20.9 |
| 8 | 63.0514 | Variable D1 | | |
| 9 (Aperture Stop) | — | Variable D2 | | |
| 10* | 22.4598 | 3.64 | 1.74320 | 49.3 |
| 11* | −99.4552 | 0.10 | | |
| 12 | 14.1697 | 4.68 | 1.49700 | 81.6 |
| 13 | −75.8428 | 0.10 | | |
| 14 | 48.7055 | 2.10 | 1.51633 | 64.1 |
| 15 | −27.2550 | 0.10 | | |
| 16 | 21.5305 | 0.65 | 1.92286 | 18.9 |
| 17 | 8.2079 | 1.27 | | |
| 18 | 19.8079 | 1.89 | 1.77250 | 49.6 |
| 19 | −34.7107 | Variable D3 | | |
| 20 | ∞ | 1.50 | 1.51633 | 64.1 |
| 21 | ∞ | | | |

TABLE 14

Example 5
Aspherical Data

S10 (Tenth Surface)

| K | B3 | B4 | B5 | B6 |
|---|---|---|---|---|
| 0.00000E+00 | 1.02358E−04 | −1.18490E−04 | 6.66871E−06 | −6.09828E−07 |

| B7 | B8 | B9 | B10 | B11 |
|---|---|---|---|---|
| −4.56307E−08 | −3.25379E−09 | 2.24499E−10 | −4.58857E−11 | −1.60439E−12 |

| B12 | B13 | B14 | B15 | B16 |
|---|---|---|---|---|
| −1.46953E−13 | 6.55204E−15 | 4.29519E−15 | 8.38526E−16 | 1.55001E−16 |

| B17 | B18 | B19 | B20 |
|---|---|---|---|
| 2.30138E−17 | 3.02349E−18 | 3.40494E−19 | 2.44205E−20 |

S11 (Eleventh Surface)

| K | B3 | B4 | B5 | B6 |
|---|---|---|---|---|
| 0.00000E+00 | 7.73913E−05 | 1.12181E−05 | 4.97854E−06 | 4.38093E−07 |

| B7 | B8 | B9 | B10 | B11 |
|---|---|---|---|---|
| −2.32320E−07 | 1.56272E−08 | −6.38460E−10 | −7.20270E−12 | 3.81225E−14 |

| B12 | B13 | B14 | B15 | B16 |
|---|---|---|---|---|
| 1.58578E−13 | 4.18152E−14 | 8.07424E−15 | 9.61237E−16 | 1.39090E−16 |

| B17 | B18 | B19 | B20 |
|---|---|---|---|
| 1.46458E−17 | 1.50499E−18 | 1.28263E−19 | 1.08730E−20 |

TABLE 15

Example 5
Various data

| | Focal Length | Fno. | Whole angle of view | Variable D1 | Variable D2 | Variable D3 |
|---|---|---|---|---|---|---|
| Wide Angle End | 2.86 | 1.11 | 128.4 | 17.44 | 8.34 | 1.00 |
| Telephoto End | 7.86 | 1.81 | 43.7 | 1.40 | 1.72 | 7.62 |

Example 6

Figure 6:
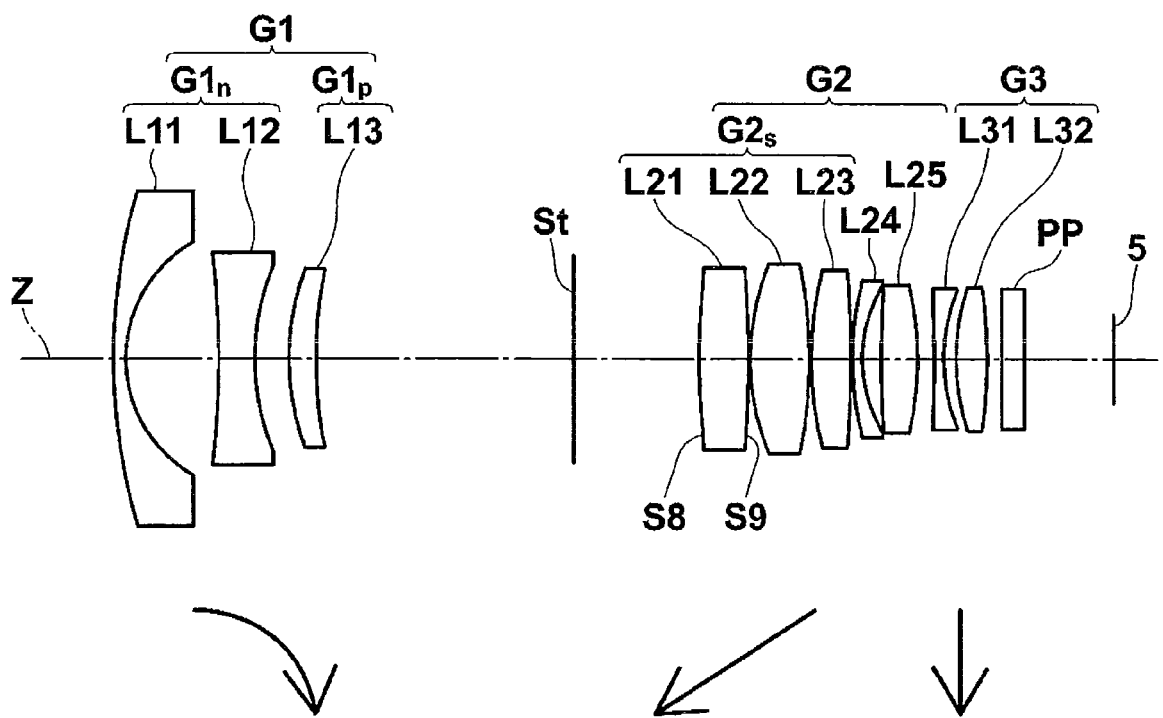
FIG. 6 is a sectional view showing a lens arrangement of a variable power optical system of Example 6 of the present invention.
Figure 7:
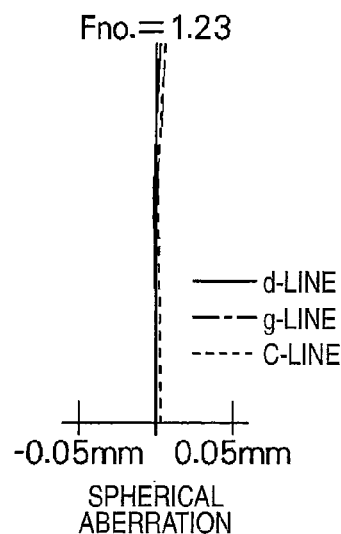
FIG. 7 is aberration diagrams of a variable power optical system of Example 1 of the present invention.
Figure 7:
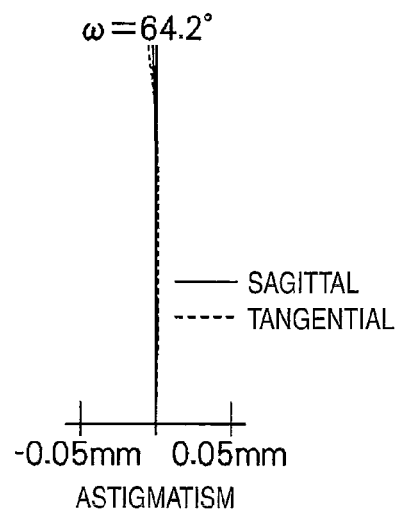
Figure 7:
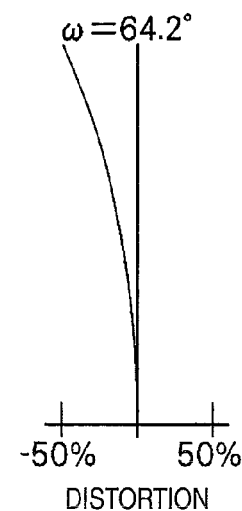
Figure 7:
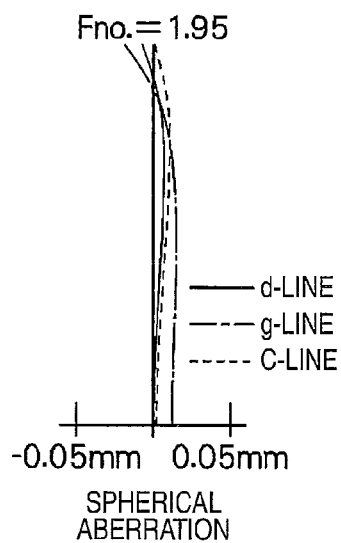
Figure 7:
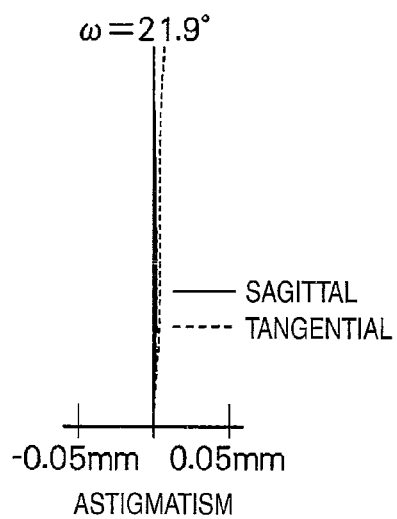
Figure 7:
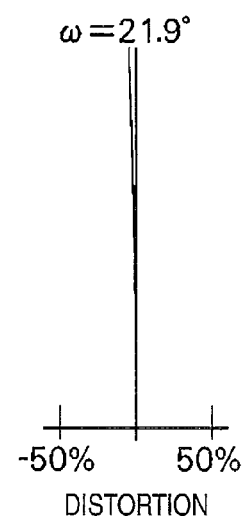
Figure 8:
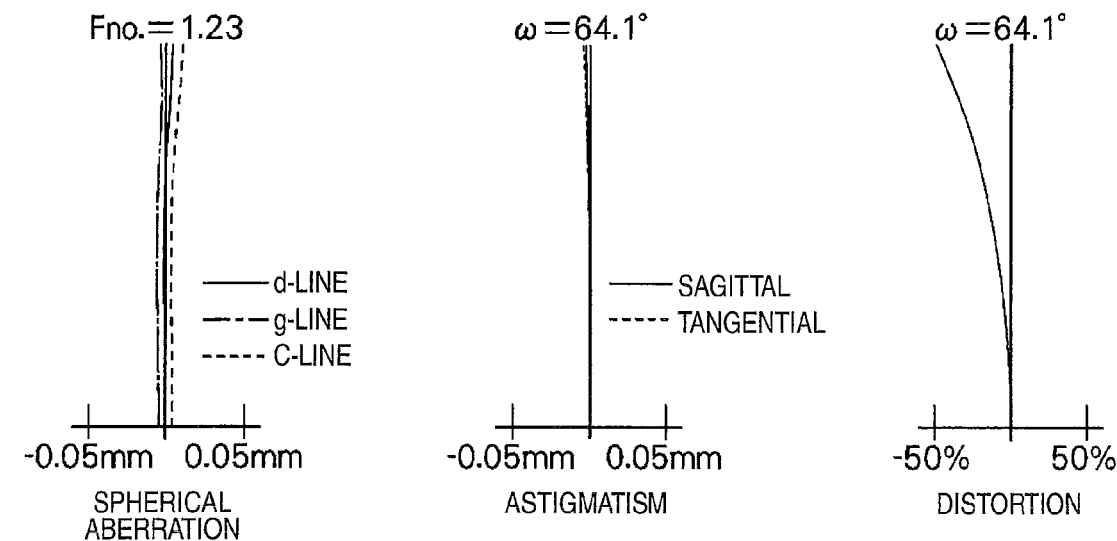
FIG. 8 is aberration diagrams of a variable power optical system of Example 2 of the present invention.
Figure 8:
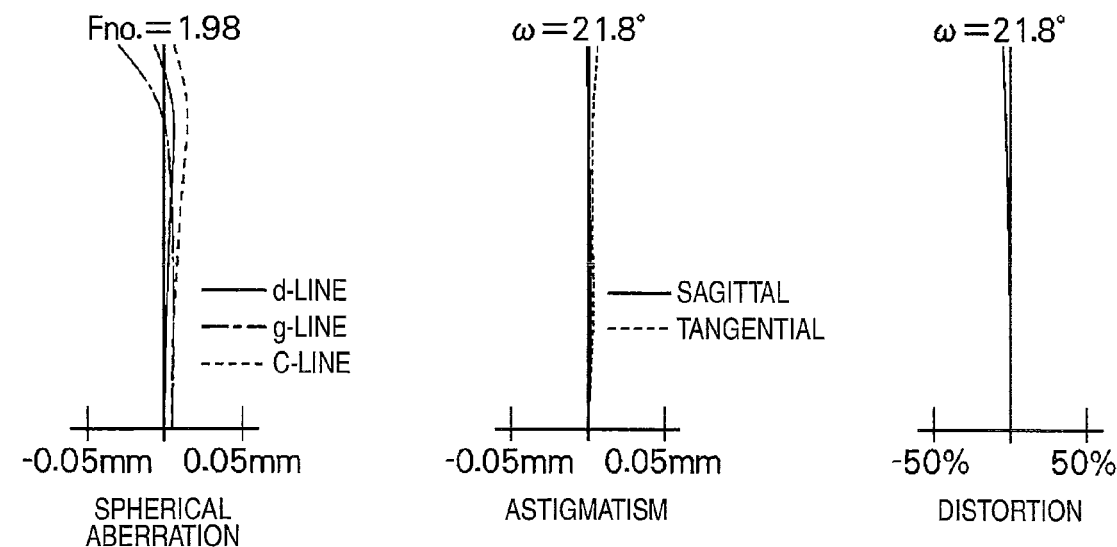
Figure 9:
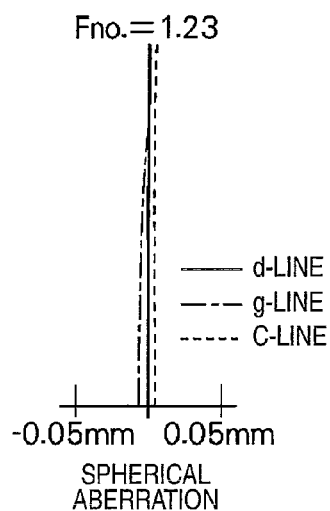
FIG. 9 is aberration diagrams of a variable power optical system of Example 3 of the present invention.
Figure 9:
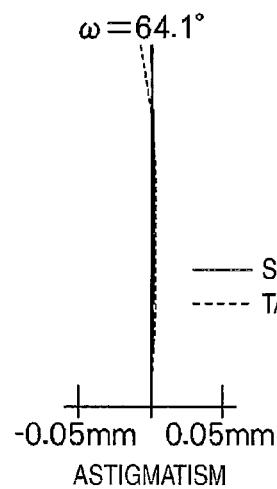
Figure 9:
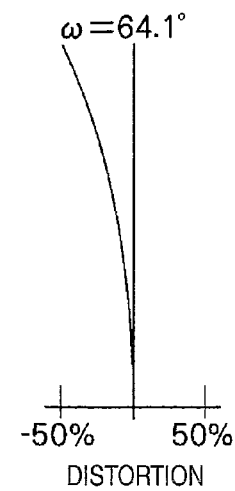
Figure 9:
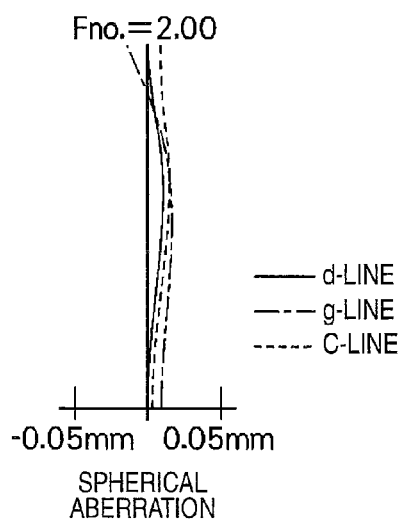
Figure 9:
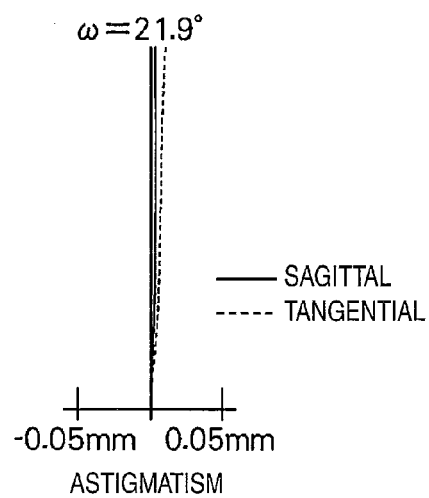
Figure 9:
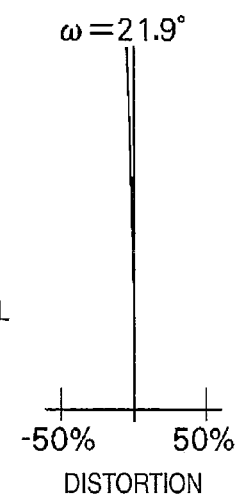
Figure 10:
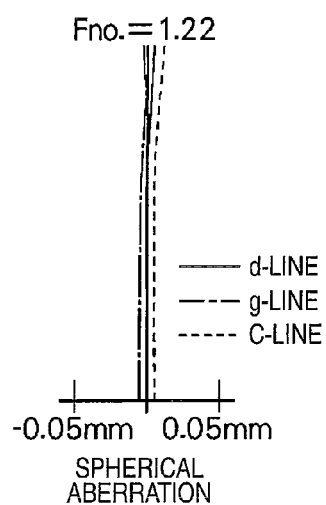
FIG. 10 is aberration diagrams of a variable power optical system of Example 4 of the present invention.
Figure 10:
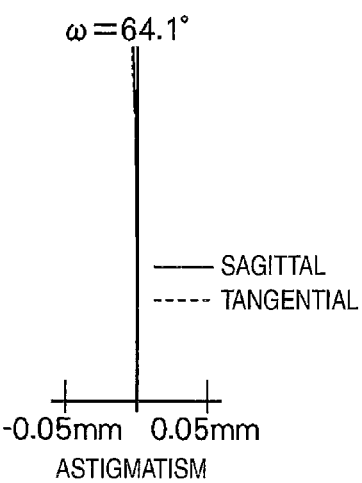
Figure 10:
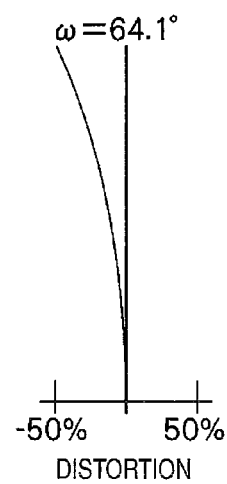
Figure 10:
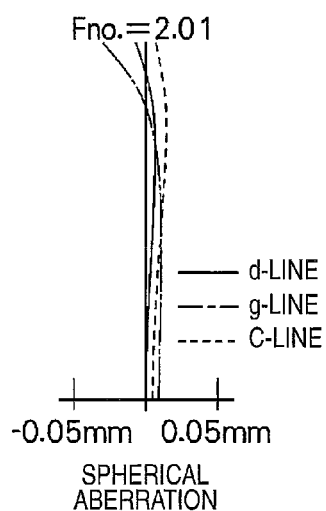
Figure 10:
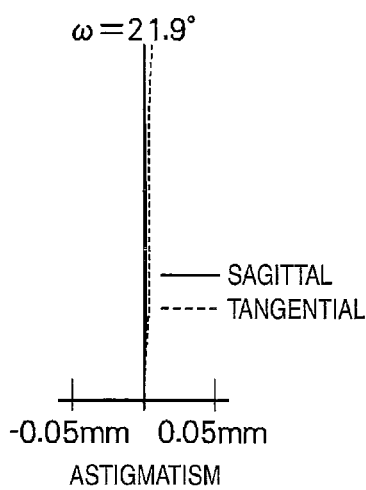
Figure 10:
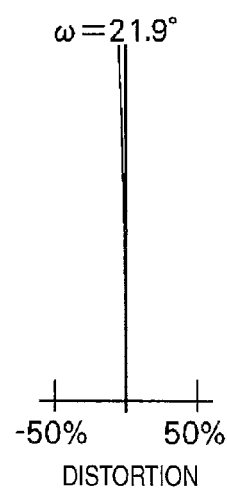
Figure 11:
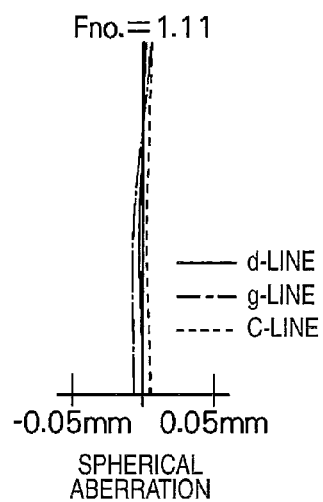
FIG. 11 is aberration diagrams of a variable power optical system of Example 5 of the present invention.
Figure 11:
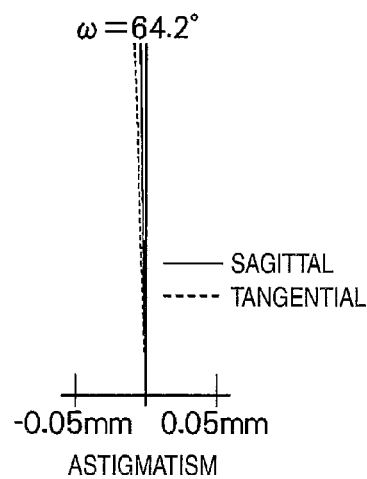
Figure 11:
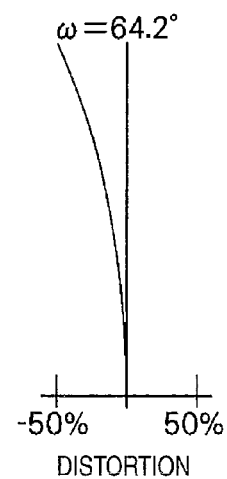
Figure 11:
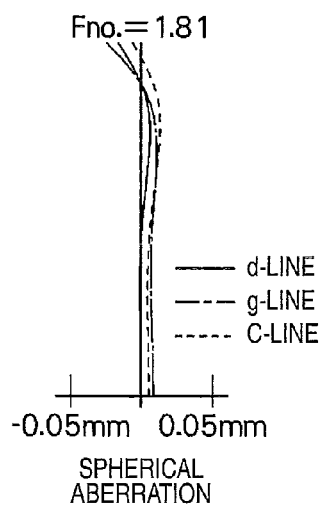
Figure 11:
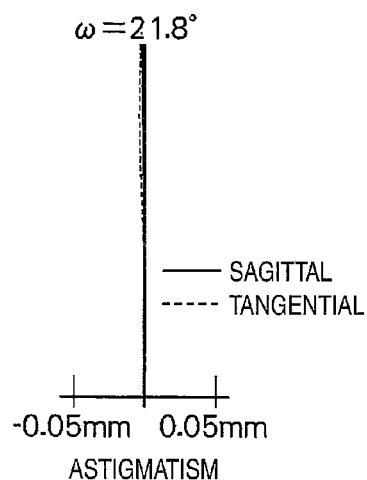
Figure 11:
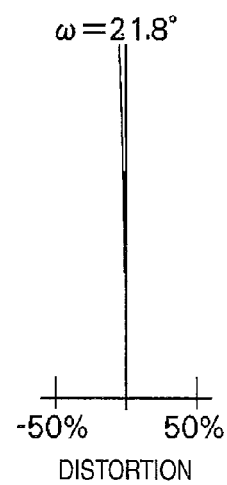
Figure 12:
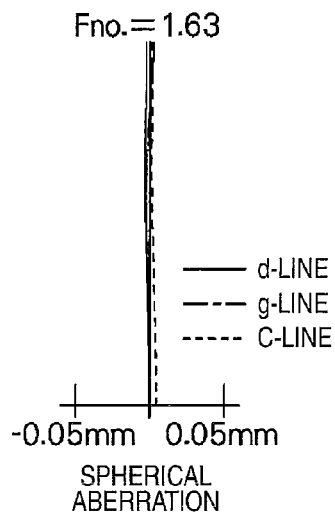
FIG. 12 is aberration diagrams of a variable power optical system of Example 6 of the present invention.
Figure 12:
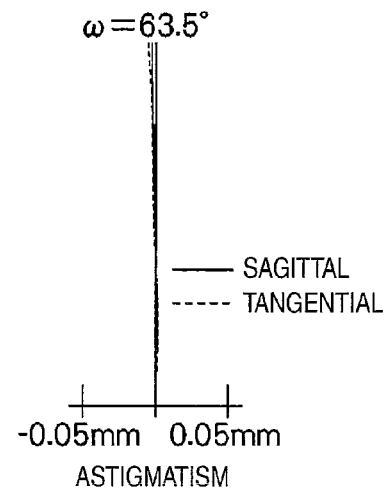
Figure 12:
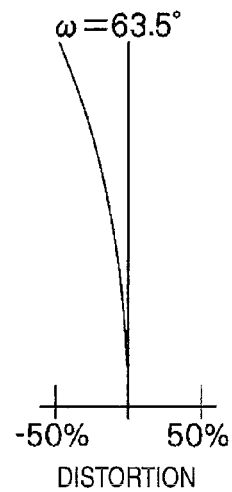
Figure 12:
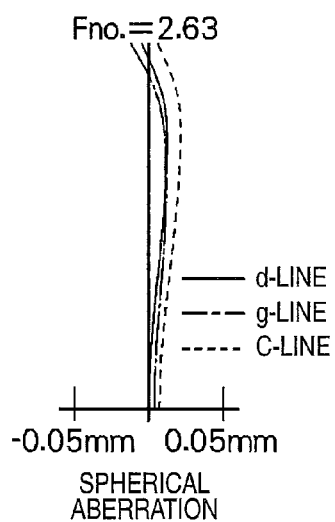
Figure 12:
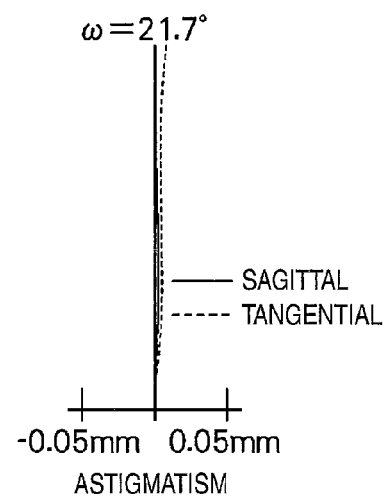
Figure 12:
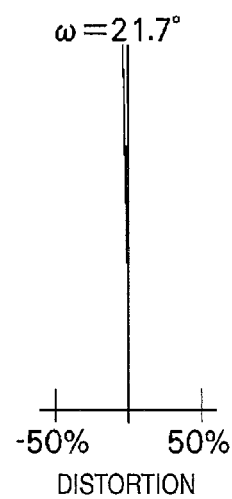

FIG. 6 is a sectional view showing a lens of Example 6. The variable power optical system of Example 6 includes: a first lens group G1; an aperture stop St, a second lens group G2 and a third lens group G3. The first lens group G1 includes three lenses including a negative meniscus lens L11, a biconcave lens L12 and a positive meniscus lens L13. The second lens group G2 includes five lenses including a biconvex lens L21 in the paraxial region, a biconvex lens L22, a biconvex lens L23, a negative meniscus lens L24 and a biconvex lens L25. The third lens group G3 is a stationary group not moved at the time of operation of variable power. The third lens group G3 is formed out of two lenses including a biconcave lens L31 and a biconvex lens L32. In Example 6, variable D3 is different from that of the above example. Variable D3 is an on-axis surface spacing between the second lens group G2 and the third lens group G3. The surface S8 on the object side of the lens L21 and the surface S9 on the image side are aspherical.

The lens data of the variable power optical system of Example 6 is shown on Table 16, the aspherical data is shown on Table 17 and various data is shown on Table 18.

TABLE 16

Example 6
Lens Data

| Si | Ri | Di | Ndj | vdj |
|---|---|---|---|---|
| 1 | 39.8354 | 0.86 | 1.75500 | 52.3 |
| 2 | 9.1077 | 6.26 | | |
| 3 | −59.6355 | 2.33 | 1.72916 | 54.7 |
| 4 | 16.8452 | 2.26 | | |
| 5 | 17.2592 | 1.83 | 1.92286 | 18.9 |
| 6 | 30.2699 | Variable D1 | | |
| 7 (Aperture Stop) | — | Variable D2 | | |
| 8* | 42.9796 | 3.31 | 1.67003 | 47.3 |
| 9* | −58.8437 | 0.10 | | |
| 10 | 16.4930 | 4.06 | 1.49700 | 81.6 |
| 11 | −30.8988 | 0.10 | | |
| 12 | 24.2738 | 2.70 | 1.51633 | 64.1 |
| 13 | −75.9997 | 0.10 | | |
| 14 | 21.0403 | 0.65 | 1.92286 | 18.9 |
| 15 | 9.6112 | 1.29 | | |
| 16 | 83.1190 | 2.44 | 1.77250 | 49.6 |
| 17 | −21.5415 | Variable D3 | | |
| 18 | −200.8812 | 0.60 | 1.83400 | 37.2 |
| 19 | 12.0572 | 0.86 | | |
| 20 | 15.4788 | 2.08 | 1.67270 | 32.1 |
| 21 | −35.0321 | 1.00 | | |
| 22 | ∞ | 1.50 | 1.51633 | 64.1 |
| 23 | ∞ | | | |

TABLE 17

Example 6
Aspherical Data

S8 (Eighth Surface)

| K | B3 | B4 | B5 | B6 |
|---|---|---|---|---|
| 0.00000E+00 | 1.20805E−04 | −1.16536E−04 | 6.75809E−06 | −6.19296E−07 |

| B7 | B8 | B9 | B10 | B11 |
|---|---|---|---|---|
| −4.49989E−08 | −2.60641E−09 | 3.73820E−10 | −2.82276E−11 | 4.18562E−13 |

| B12 | B13 | B14 | B15 | B16 |
|---|---|---|---|---|
| 1.61844E−13 | 2.48328E−14 | 3.18023E−15 | 2.19517E−16 | 2.68068E−17 |

| B17 | B18 | B19 | B20 |
|---|---|---|---|
| 2.02362E−18 | 1.53502E−19 | 1.45858E−20 | −1.05287E−21 |

S9 (Ninth Surface)

| K | B3 | B4 | B5 | B6 |
|---|---|---|---|---|
| 0.00000E+00 | 1.23713E−04 | 1.39735E−05 | 5.15769E−06 | 4.74250E−07 |

| B7 | B8 | B9 | B10 | B11 |
|---|---|---|---|---|
| −2.24771E−07 | 1.69245E−08 | −4.67527E−10 | 9.43155E−12 | 8.47486E−13 |

TABLE 17-continued

Example 6
Aspherical Data

| B12 | B13 | B14 | B15 | B16 |
|---|---|---|---|---|
| 7.83227E−14 | 4.98078E−15 | 1.09915E−15 | −5.40352E−17 | 1.18021E−17 |
| B17 | B18 | B19 | B20 | |
| 8.68114E−19 | 1.91460E−19 | 2.06947E−20 | 2.31201E−21 | |

TABLE 18

Example 6
Various data

| | Focal Length | Fno. | Whole angle of view | Variable D1 | Variable D2 | Variable D3 |
|---|---|---|---|---|---|---|
| Wide Angle End | 3.79 | 1.63 | 127.0 | 17.28 | 8.43 | 1.07 |
| Telephoto End | 10.43 | 2.63 | 43.4 | 2.02 | 0.99 | 8.50 |

Numerical values corresponding to the conditional expressions (1) to (3) in Examples 1 to 6 are shown on Table 19. As can be seen on Table 19, the conditional expressions (1) to (3) are satisfied in all of Examples 1 to 6.

TABLE 19

| | Example 1 | Example 2 | Example 3 | Example 4 | Example 5 | Example 6 |
|---|---|---|---|---|---|---|
| Conditional Expression (1) f21/f2 | 2.04 | 4.01 | 1.31 | 2.12 | 2.15 | 3.05 |
| Conditional Expression (2) vd2m | 81.6 | 68.5 | 81.6 | 64.1 | 72.85 | 72.85 |
| Conditional Expression (3) vd1p | 18.9 | 18.9 | 18.9 | 18.9 | 20.88 | 18.9 |

FIGS. 7 to 12 are aberration diagrams showing spherical aberration, astigmatizm and distortion at the wide angle end and the telephoto end in the variable power systems of Examples 1 to 6. In FIGS. 7 to 12, a figure at the wide angle end is attached with WIDE and a figure at the telephoto end is attached with TELE. In each aberration diagram, the aberration, in which the reference wavelength is the d-line, is shown. However, in the view showing aberration, the aberration at the g-line (wavelength 436 nm) and the C-line (wavelength 656.3 nm) is also shown. Fno. shown in the aberration diagram is the F-value. Reference mark co shown in the aberration diagrams of astigmatizm and distortion is a half angle of view.

From the above data, the following can be understood. In Examples 1 to 6, in the variable power optical system, the magnifying power of which is approximately 2.8, the optical system is made compact and the aperture ratio of the lens system is high in which the F-value at the wide angle end is 1.11 to 1.63, that is, the lens system is fast. Further, the aberration is excellently corrected and the optical performance is high in the visible region at both the wide angle end and the telephoto end.

Figure 13:
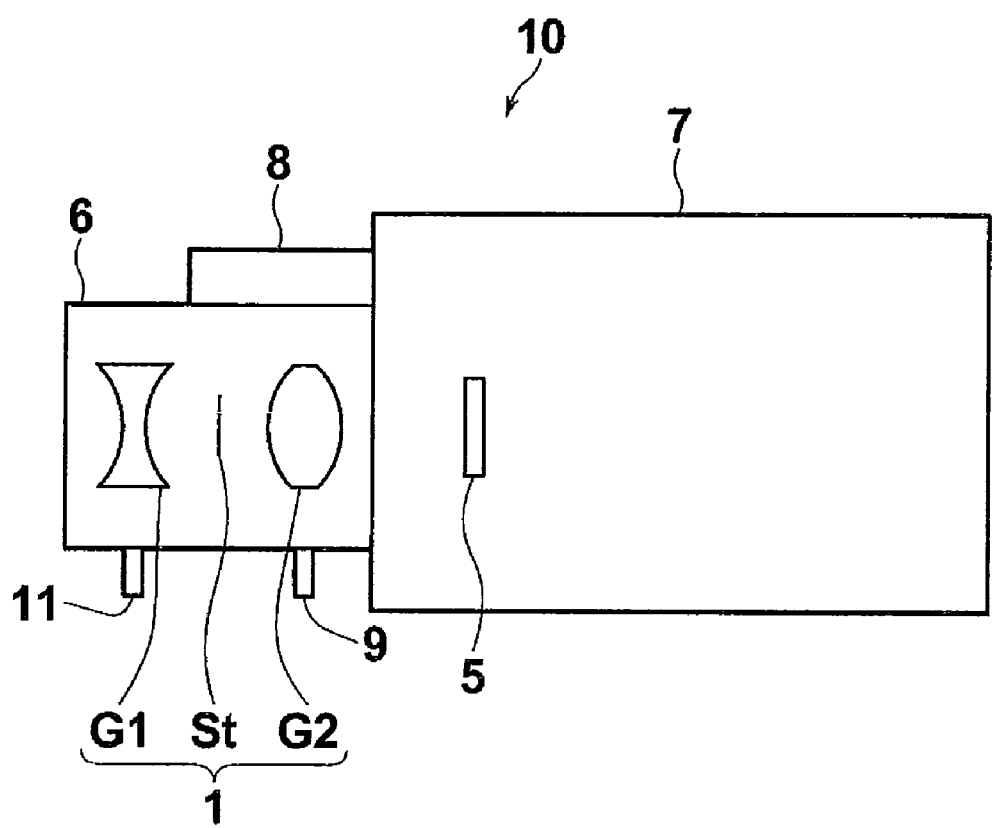
FIG. 13 is a sectional view briefly showing an imaging device according to an exemplary embodiment of the present invention.

FIG. 13 is an arrangement view showing an outline of a surveillance camera, which is an imaging device, to which a variable power optical system of the present invention is applied. The surveillance camera 10 shown in FIG. 13 includes a lens unit 6 and a camera body 7. In the lens unit 6, the variable power optical system 1 of the embodiment of the present invention is arranged. In this connection, FIG. 13 briefly shows the variable power optical system 1 having the first lens group G1, the aperture stop St and the second lens group G2.

The imaging element 5 for taking an object image formed by the variable power optical system 1 is arranged in the camera body 7. Specific examples of the imaging element 5 are: CCD (Charge Coupled Device) and CMOS (Complementary Metal Oxide Semiconductor) for converting an optical image formed by the variable power optical system into an electric signal. The imaging element 5 is arranged so that the imaging plane can agree with an image formation plane of the variable power optical system 1.

The stop mechanism 8 for changing a stop diameter of the aperture stop St is arranged above the lens unit 6. Below the lens unit 6, the zooming knob 9 for changing a magnifying power of the variable power optical system 1 and the focus knob 11 for adjusting a focus of the variable power optical system 1 are arranged.

The variable power optical system 1 of the embodiment of the present invention has the above advantages. Therefore, the imaging device of the present embodiment can be made compact and excellently used even under a photographing condition of low illuminance and further it is possible to obtain an image of high quality.

The present invention has been explained above referring to the embodiments and examples. However, it should be noted that present invention is not limited to the above specific embodiments and examples but variations can be made. For example, the values of the radius of curvature of each lens component, the on-axis surface spacing between the surfaces and the refraction factor are not limited to the values shown in the above examples but it is possible to use other values.

In the embodiment described above, the imaging device is applied to a surveillance camera. However, the present invention is not limited to the specific example. For example, the imaging device can be applied to other imaging devices such as a video camera and an electronic still camera.

What is claimed is:

1. A variable power optical system comprising: in order from an object side thereof,
    a first lens group having a negative refractive power and including a negative lens group and a positive lens group in order from the object side;
    a stop; and
    a second lens group having a positive refractive power and including a sub-lens group on the most object side thereof, the sub-lens group including, in order from the object side, a first lens having a positive refractive power having at least one aspherical surface, a second lens having a positive refractive power, and a third lens having a positive refractive power,
    wherein
    the second lens group is moved to the object side along an optical axis thereof to perform a variable power operation from a wide angle end to a telephoto end of the variable power optical system, and the first lens group is moved to make a correction of an image plane position in accordance with the variable power operation, and
    the second lens group consists of five lenses including the sub-lens group, a negative meniscus lens having a concave surface on an image side thereof, and a biconvex lens having a positive refractive power in order from the object side.

2. The variable power optical system according to claim 1, satisfying conditional expression (1):

$$1.2 < f21/f2 < 4.5 \quad (1)$$

wherein f2 is a focal length of the second lens group and f21 is a focal length of the first lens of the second lens group.

3. The variable power optical system according to claim 1, satisfying conditional expression (2):

$$vd2m > 60.0 \quad (2)$$

wherein vd2m is an average value of Abbe numbers of the second and the third lens at the d-line.

4. The variable power optical system according to claim 1, wherein the first lens group includes three lenses including a negative meniscus lens, a biconcave lens having a negative refractive power, and a positive lens in order from the object side.

5. The variable power optical system according to claim 1, wherein the first lens group includes four lenses including a negative meniscus lens, a negative meniscus lens, a biconcave lens having a negative refractive power, and a positive lens in order from the object side.

6. The variable power optical system according to claim 1, wherein the first lens group includes at least one positive lens satisfying conditional expression (3):

$$vd1p < 21.0 \quad (3)$$

wherein vd1p is an Abbe number of the at least one positive lens at the d-line.

7. The variable power optical system according to claim 1, further comprising a third lens group having a negative refractive power and arranged on the image side of the second lens group, the third lens group being fixed at a time of the variable power operation.

8. The variable power optical system according to claim 2, satisfying conditional expression (2):

$$vd2m > 60.0 \quad (2)$$

wherein vd2m is an average value of Abbe numbers of the second and the third lens at the d-line.

9. The variable power optical system according to claim 2, wherein the first lens group includes three lenses including a negative meniscus lens, a biconcave lens having a negative refractive power, and a positive lens in order from the object side.

10. The variable power optical system according to claim 2, wherein the first lens group includes four lenses including a negative meniscus lens, a negative meniscus lens, a biconcave lens having a negative refractive power, and a positive lens in order from the object side.

11. The variable power optical system according to claim 2, wherein the first lens group includes at least one positive lens satisfying conditional expression (3):

$$vd1p < 21.0 \quad (3)$$

wherein vd1p is an Abbe number of the at least one positive lens at the d-line.

12. The variable power optical system according to claim 2, further comprising a third lens group having a negative refractive power and arranged on the image side of the second lens group, the third lens group being fixed at a time of the variable power operation.

13. An imaging device comprising:
    a variable power optical system according to claim 1; and
    an imaging element for taking an object image formed by the variable power optical system.

14. An imaging device comprising:
    a variable power optical system according to claim 2; and
    an imaging element for taking an object image formed by the variable power optical system.

* * * * *